Oct. 30, 1923.

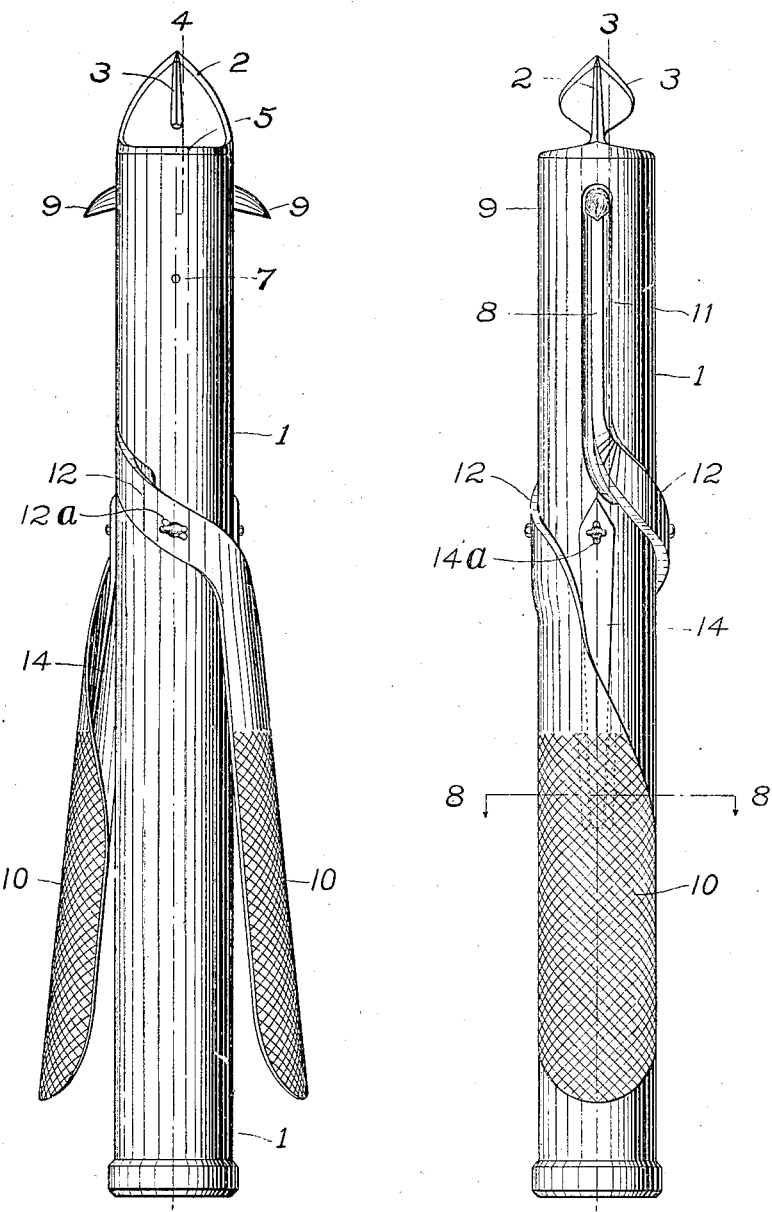

W. B. WESCOTT

TROCAR

Filed April 8, 1919

INVENTOR,
William B. Wescott
BY
Roberts Roberts &
ATTORNEYS

Patented Oct. 30, 1923.

1,472,377

UNITED STATES PATENT OFFICE.

WILLIAM B. WESCOTT, OF WELLESLEY, MASSACHUSETTS, ASSIGNOR, BY MESNE ASSIGNMENTS, TO AMERICAN PROTEIN CORPORATION, OF BOSTON, MASSACHUSETTS, A CORPORATION OF MASSACHUSETTS.

TROCAR.

Application filed April 8, 1919. Serial No. 288,641.

*To all whom it may concern:*

Be it known that I, WILLIAM B. WESCOTT, a citizen of the United States of America, and resident of Wellesley, in the county of Norfolk and State of Massachusetts, have invented new and useful Improvements in Trocars, of which the following is a specification.

This invention relates to an instrument, which is a species of trocar, for collecting blood from food animals at the time of slaughter, and its principal object is to provide an instrument with which it is possible to collect the blood under ordinary slaughter house conditions free from contamination and suitable for human food or for therapeutic purposes.

The solid constituents of the defibrinated blood of food animals consist mainly in proteins. The proteins obtained from the blood of food animals, whether from the whole defibrinated blood or from the blood serum, have many valuable uses both as human food and for therapeutic purposes. For example, serum obtained from the blood of beef creatures has approximately the same composition and food value as the white of an egg when reduced to the same moisture content. It has substantially the same protein content, the albumin is equally easily digested, it will beat up into a stiff white froth like the white of an egg, and it is at least equal to egg white when used to increase viscosity, that is, to form bubbles and produce "lightness" in bread, cake and other products.

Little if any use has heretofore been made of blood or blood serum from slaughtered animals for human food or therapeutic purposes for the reason I believe that it has been impossible under slaughter house conditions to collect the blood without permitting it to come in contact with the surface of the animal, or foreign matter in the atmosphere, or other contaminating influences. If the blood can be collected directly from within a large blood vessel of the animal and transferred clean and untainted to a suitable receptacle, dried blood serum can be obtained equal in food value and culinary properties to commercial egg white, and superior thereto in cleanliness and in low bacterial count. To be practicable the appliances for so obtaining the blood must be such as not to interfere unduly with the regular slaughtering procedure.

To this end I have invented an instrument in the nature of a trocar, which may be readily inserted into a large blood vessel such as the aorta, the main artery leading from the heart, at the time of slaughter, which will be self retained therein, which may be connected by a pipe or tube to a suitable receiving vessel, which may be readily released and removed when the blood has been withdrawn and which will permit the free flow of the blood from the blood vessel without exposure to contact with the animal or the atmosphere, or other contaminating influences. These and other features of the invention will hereinafter be more fully described, and particularly pointed out in the claims.

In the accompanying drawings which illustrate an embodiment of the invention,

Figure 1 is a side elevation of the instrument;

Figure 2 is a side elevation taken at right angles to that shown in Fig. 1;

Figure 3:
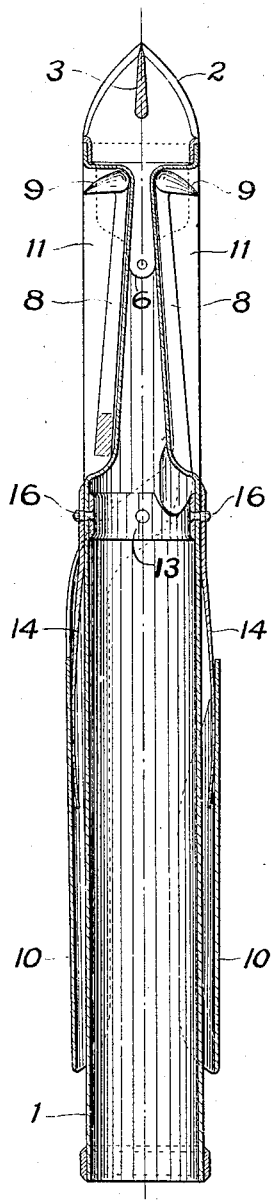
Figure 3 is a longitudinal section, partly in elevation, on line 3—3 of Fig. 2.
Figure 5:
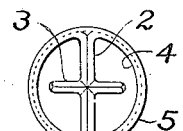
Figure 5 is a top or end view of the perforator.
Figure 6:
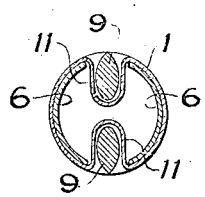
Figure 6 is a section on line 6—6 of Fig. 4.
Figure 7:
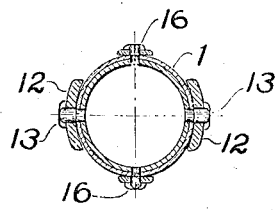
Figure 7 is a section on line 7—7 of Fig. 4.
Figure 8:
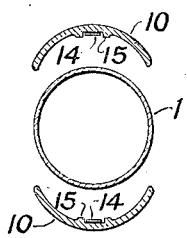
Figure 8 is a section on line 8—8 of Fig. 2.
Figure 4:
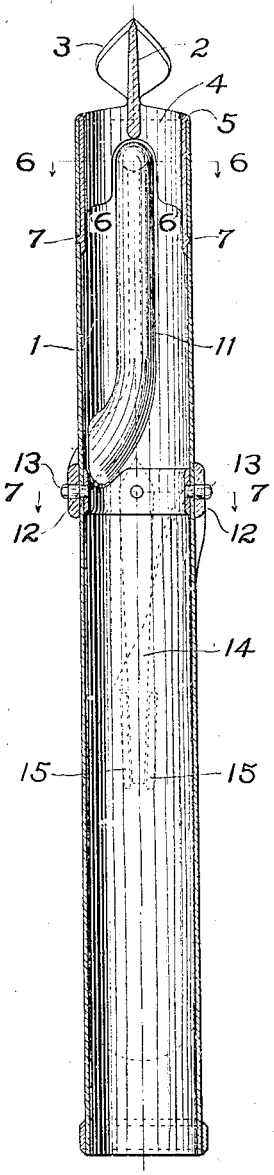
Figure 4 is a longitudinal section, partly in elevation, on line 4—4 of Fig. 1.

The trocar comprises a cannula or tube 1 to the forward end of which is positively fixed a perforator having a sharp point and cutting edges designed to penetrate readily the cellular tissues surrounding the blood vessel, and to enter the blood vessel and slide along inside the blood vessel as a sheath. In use the trocar should be inserted in the blood vessel in the direction opposite to the flow of blood so that the blood will normally enter the open end of the cannula. The perforator consists as herein shown of two crossed, diametrically disposed blades 2 and 3, one of which, the blade 2, extends substantially the full diameter of the cannula and the other of which, the blade 3, terminates short of the full diameter of the cannula. The blades come to a point at their intersection. The longer blade, 2, cuts a slit, in the tissues being penetrated, of approximately the same length as the diameter of the cannula, and the shorter blade 3 cuts two short slits extending at right angles from the middle of the longer slit, thus facilitating the entrance of the cannula into the opening but at the same time producing a cut enough smaller than the cannula to cause the tough elastic tissues snugly to hug the cannula. The crossed blades 2, 3, also hold the walls of the blood vessel, after the instrument is inserted, from collapsing across the end of the cannula and so cutting off the flow of blood through the cannula. The points of the blades are sufficiently sharp and tapered readily to penetrate the tissues from the outside, but are sufficiently blunt or widely tapered so that in sliding along inside the blood vessel the point will not be likely to catch in the walls of the blood vessel and penetrate the same a second time from the interior.

The perforator may be permanently fixed to the end of the cannula but is preferably made removable for the purpose of cleansing, sharpening, repair or renewal. In either case it will be firmly and positively fixed in position. In order that it may be removably fixed in place I have provided an annular base 4 to carry the blades, fitting snugly in the forward end of the cannula, and provided with a flange or lip 5 fitting over the edge of the cannula to produce a smooth, rounded, entering end which will not catch on the lips of the cut in the tissues being penetrated. The base 4 has a pair of stiffly resilient tongues 6 extending into the bore of the cannula between the depressions 11 of the cannula, and having projections or catches 7 which snap into corresponding holes or sockets in the walls of the cannula and lock the perforator firmly in place.

To retain the trocar in position in the body of the animal after it has been inserted in the blood vessel, and so to permit the free and continuous flow of blood through the cannula without further attention on the part of the operator, I provide a pair of levers pivoted to opposite sides of the cannula, and each having a hook or projection to engage the inner walls of the blood vessel. The forward end 8 of each lever is provided with a sharp hook 9, and the rear end 10 constitutes a handle or hand grip. The cannula is formed with a pair of oppositely disposed, lengthwise extending recesses or depressions 11, in which the forward ends of the levers and their hooks may be housed.

The forward hooked end of each lever and its rear or handle end are positioned on opposite sides of the cannula and are joined by a connecting part 12 extending helically part way around the cannula. The levers are pivoted at their connecting parts 12 on pivot pins 13 mounted on the cannula. Springs 14, also carried by the cannula extend underneath the hand grips 10, normally urging the same outward, and therefore normally holding the forward ends of the levers and hooks 9 projected from the recesses 11. When the hand grips 10 are compressed together by the hand of the user, these hooks are retracted and housed in their recesses, and being contained within the periphery of the cannula they do not interfere with the introduction of the instrument into the blood vessel. But upon the release of the hand grips, after the instrument has been inserted, the springs will force the forward ends of the levers outwardly, and project the hooks 9 beyond the periphery of the cannula into engagement with the interior of the walls of the blood vessel thus retaining the instrument in position in the animal until the hand grips are again compressed to release the retaining hooks and permit the instrument to be withdrawn. The helical connecting parts 12 fit the cannula somewhat loosely to permit the desired movement of the levers, and also provide shoulders or stops to engage the cannula and limit the outward movement of the levers.

The levers, springs, and other parts if desired may be assembled without screws or threaded members, in accordance with approved practices in surgical instruments, so that the members may be readily taken apart to be cleaned.

Thus, the levers herein shown are each provided with a slot 12$^a$, approximately parallel with the part 12, through which the elongated head 17 of the pivot pin 13 is passed by slightly springing or distorting the part 12. In normal condition the head 17 is disposed at a sufficient angle to the slot 12$^a$ to retain the lever in place. Similarly the spring 14 is held in place by the head 16 of a pin which passes through slot 14$^a$ and is transverse of the slot when the parts are assembled.

It will be observed that none of the moving parts operate through the walls of the cannula, but all are wholly exterior of the cannula, and that the cannula walls are entirely imperforate or closed against leakage of blood outwardly through the walls of the cannula, or of leakage of contaminating fluids inwardly.

I claim:

1. An instrument for withdrawing blood from food animals at the time of their slaughter, comprising a cannula capable of being inserted in the slaughter wound and provided with inlet passages to permit the free flow of blood therein, and having secured to the walls thereof movable members positioned entirely without the cannula passage, said movable members being provided with means adapted to engage the walls of the incision to positively retain the cannula therein.

2. A trocar comprising a perforator, a cannula having recesses in its sides, and levers having retaining hooks thereon, said levers being pivoted to the cannula and adapted to be housed within said recesses.

3. A trocar comprising a perforator, a cannula having recesses in its sides, and levers pivoted to the cannula, the forward ends of the levers having retaining hooks and being adapted to be housed in said recesses, and the rear ends of the levers constituting hand grips.

4. A trocar comprising a perforator, a cannula having recesses in its sides, and levers pivoted to the cannula, the forward ends of the levers having retaining hooks and being adapted to be housed in said recesses, means yieldingly holding the hooks projected from said recesses, and the rear ends of the levers constituting handles by which the hooks may be retracted within said recesses.

5. A trocar comprising a perforator, a cannula having recesses in its sides, and levers pivoted to the cannula, the forward ends of the levers having retaining hooks and being adapted to be housed in said recesses, means yieldingly holding the hooks projected from said recesses, and the rear ends of the levers being positioned on the sides of the cannula opposite to their respective forward ends and constituting hand grips, by the inward movement of which the hooks will be retracted within said recesses.

6. A trocar comprising a perforator, a cannula having recesses in its sides, and levers pivoted to the cannula, the forward ends of the levers having retaining hooks and being adapted to be housed in said recesses, means yieldingly holding the hooks projected from said recesses, means limiting the projecting movement of the said levers and hooks, and the rear ends of the levers constituting handles by which the hooks may be retracted within said recesses.

7. A trocar comprising a perforator, a cannula, and levers pivoted to the cannula, the forward ends of the levers having retaining members, and the rear ends of the levers being positioned on the sides of the cannula opposite to their respective forward ends and constituting hand grips, the connecting part of each lever between the forward and rear ends extending part way around the cannula.

8. A trocar comprising a perforator, a cannula, and levers pivoted to the cannula, the forward ends of the levers having retaining members, and the rear ends of the levers being positioned on the sides of the cannula opposite to their respective forward ends and constituting hand grips, the connecting part of each lever between the forward and rear ends extending helically part way around the cannula and providing a stop adapted to engage the cannula and limit the outward movement of the lever.

9. A trocar comprising a perforator, a cannula, and levers pivoted to the cannula, the forward ends of the levers having retaining members, and the rear ends of the levers being positioned on the sides of the cannula opposite to their respective forward ends and constituting hand grips, the connecting part of each lever between the forward and rear ends extending helically part way around the cannula and providing a stop adapted to engage the cannula and limit the outward movement of the lever, and yielding means normally holding the levers outward with relation to the cannula.

10. A trocar comprising a perforator, a cannula having a pair of oppositely disposed, lengthwise extending recesses, a pair of levers the forward ends of which have retaining hooks and are adapted to be housed within said recesses, and the rear ends of which are positioned on the sides of the cannula opposite to their respective forward ends and constitute hand grips, the connecting part of each lever between the forward and rear ends extending hellically part way around the cannula and providing a shoulder adapted to engage the cannula and limit the outward movement of the lever, pivotal connections between said helical connecting parts and the cannula and springs normally urging the levers outward with relation to the cannula.

11. A trocar including a cannula, and a perforator comprising crossed blades fixed to the forward end of the cannula.

12. A trocar including a cannula, and a perforator comprising two diametrically disposed crossed blades fixed to the forward end of the cannula, one of which extends substantially the full diameter of the cannula and the other of which terminates short of the full diameter of the cannula.

13. A trocar including a cannula, and a perforator having a pair of resilient fingers extending into the end of the cannula, and means held in engagement by the resilience of said fingers for positively fastening the perforator to the cannula.

14. A trocar including a cannula, and a perforator comprising a pair of crossed blades, an annular member carrying said crossed blades, and means to secure said annular member to the end of the cannula.

15. A trocar including a cannula, and a perforator comprising a pair of crossed blades, an annular member carrying said crossed blades having a pair of fingers extending into the end of the cannula, and locking means between said fingers and the cannula to fasten the perforator to the end of the cannula.

Signed by me at Boston, Massachusetts, this seventh day of April, 1919.

WILLIAM B. WESCOTT.